Aug. 22, 1939.　　　C. I. INGWERSEN　　　2,170,305

TORCH COMPASS

Filed Aug. 17, 1938

INVENTOR.
CHRISTIAN I. INGWERSEN

BY

Wheeler, Wheeler, +Wheeler
ATTORNEYS

Patented Aug. 22, 1939

2,170,305

UNITED STATES PATENT OFFICE 2,170,305

TORCH COMPASS

Christian I. Ingwersen, Milwaukee, Wis.

Application August 17, 1938, Serial No. 225,287

1 Claim. (Cl. 266—23)

This invention relates to a torch compass.

It is illustrated as an accessory for a conventional acetylene torch, but it may be used on torches of other types.

It is a primary object of the invention to provide satisfactory means for cutting a disk of metal with a torch. More specifically, it is my purpose to provide a device including a compass bar with respect to which the torch is swiveled so that it can be used without entangling the supply lines, the compass bar being provided with supporting means facilitating the operation of the torch upon a circular path of predetermined radius and at a predetermined spacing from the work.

It is also an object of the invention to provide an arrangement whereby the torch is readily applicable to and removable from the compass device without requiring any change other than the substitution of a special nut for the nut now employed to hold the tip in place in the torch.

Other objects will appear from the following disclosure.

In the drawing.

Like parts are identified by the same reference characters throughout the several views.

Figure 1:
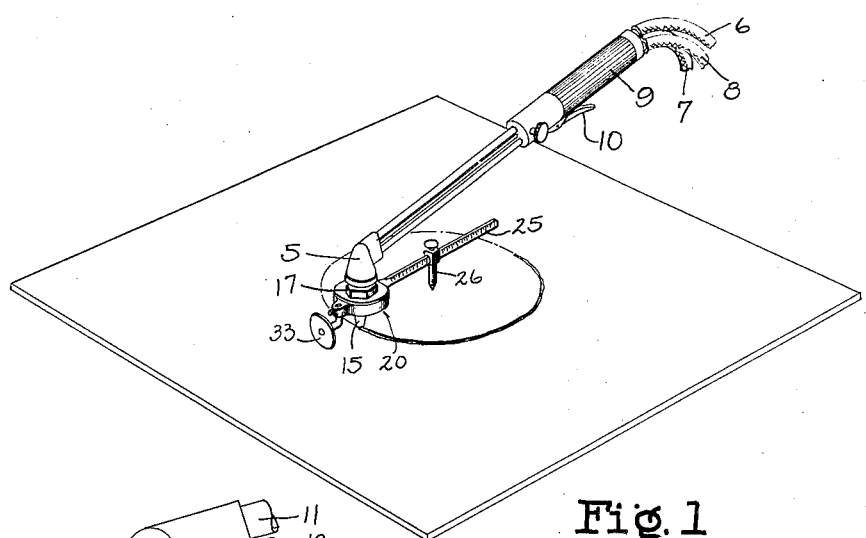
Figure 1 is a view in perspective showing the device in use.
Figure 2:
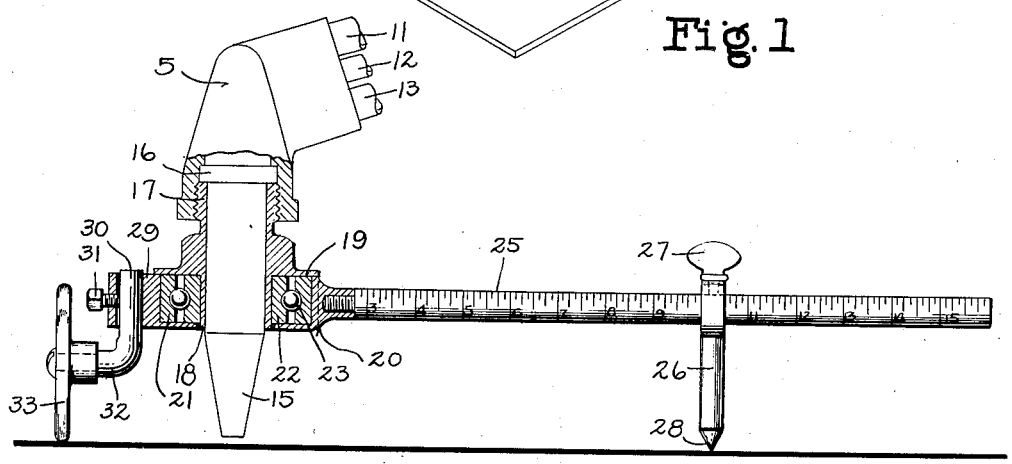
Figure 2 is a view largely in side elevation and partially in axial section showing the compass on an enlarged scale and fragmentarily illustrating the torch.
Figure 3:
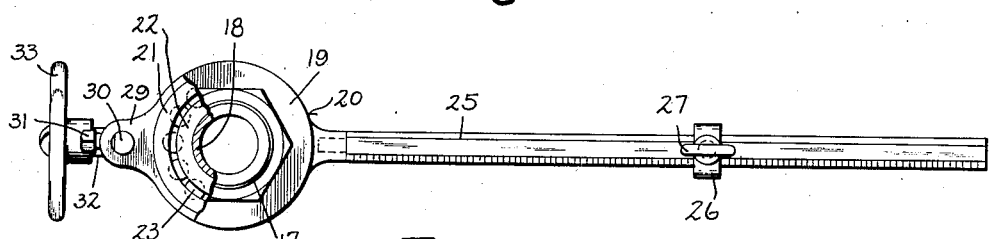
Figure 3 is a view of the mechanism shown in Fig. 1, portions of the torch being broken away to show the compass in further detail.

The torch head 5 is conventional and, as illustrated, it is supplied with gases by the supply lines 6, 7 and 8, or some thereof. These lines enter the handle 9 where, subject to the control exerted by a valve lever 10, the gases pass through the tubes 11, 12 and 13 to the head 5.

Replaceably connected to the torch head 5 is the tip 15 which is headed at 16 to be engaged by the retaining nut 17 which is in the form of a tubular plug. In accordance with the present invention this retaining nut is of special design, being provided at 18 with a sleeve-like extension and at 19 with a flange, these parts being devised to co-operate with the bearing portion of the compass as hereinafter to be described.

The compass head 20 is centrally apertured to receive the sleeve 18 through which the tip 15 projects. About the aperture I prefer to provide an anti-friction bearing having its outer race 21, its inner race 22, and the intervening balls 23 all received in a socket in the compass head 20 and covered by the flange 19. While the anti-friction bearing is not essential, it assists in the free swiveling of the torch in the compass and prevents erratic cutting which might result if the torch were to become stuck in the compass during the use of the device.

From the compass head 19 projects a bar 25 which is preferably calibrated in inches as measured from the tip 15. On this bar the compass post 26 is adjustably positioned by means of the set screw 27, the post being pointed at 28 to fix the center about which the desired circle may be described.

An ear 29 projecting from the compass head 20 has a vertical bore to receive the adjustable wheel post 30, such post being fixed in any desired adjustment by the set screw 31. Below the compass head the post is bent at right angles to provide the skein 32 upon which turns a supporting wheel at 33.

The flange 19 not only encloses and houses the bearing, but limits the downward movement of the torch with respect to the compass, thereby providing a support which fixes the position of the torch tip 15 at a level above the work which is accurately determined by the supporting wheel 33 and the adjustment thereof with respect to the compass head.

The compass post 26 being adjusted to the correct radius on the bar 25, the point 28 is held to the work and the torch may be grasped by the handle and manipulated to cause the tip 15 to describe an arcuate path. The swiveling of the torch on the compass bar enables the direction of projection of the torch handle and the supply lines 6, 7 and 8 thereof to remain unchanged, thus preventing any tangling of such lines. As above noted, accuracy in the use of the tool is enhanced by the use of the anti-friction bearing which prevents any sticking of the torch in its swiveling movement in the compass attachment.

All torches are not alike in respect of the mounting nuts employed to retain their replaceable tips. It will, however, be noted that the above tool may be adapted as an accessory for any torch by simply supplying for such torch a nut 17 of a construction to fit the particular torch and constituting an adapter for the accessory as illustrated.

I claim:

A device of the character described comprising an annular cup-shaped head having a centrally apertured bottom, said head being provided at diametrically opposite sides respectively with a wheeled support and a compass bar adjustably provided with a compass post, of an anti-friction bearing having two races concentrically disposed within said annular head, the innermost of said races having its inner periphery provided with an opening no larger than the opening in the bottom of said head, and a member having a flange overlying said inner race and a sleeve portion extending through the inner race and through the opening in the bottom of said head and adapted to receive the tip of a torch for the swiveling of the torch in said head and the guidance thereof about said post.

CHRISTIAN I. INGWERSEN.